US007923066B2

(12) United States Patent
Valle et al.

(10) Patent No.: US 7,923,066 B2
(45) Date of Patent: Apr. 12, 2011

(54) ORGANIC-INORGANIC HYBRID MATERIAL COMPRISING A MINERAL MESOPOROUS PHASE AND AN ORGANIC PHASE, A MEMBRANE AND FUEL CELL

(75) Inventors: Karine Valle, Tours (FR); Philippe Belleville, Tours (FR); Clément Sanchez, Bures sur Yvette (FR)

(73) Assignee: Commissariat a l'Energie Atomique, Paris (FR)

( * ) Notice: Subject to any disclaimer, the term of this patent is extended or adjusted under 35 U.S.C. 154(b) by 1223 days.

(21) Appl. No.: 10/542,768

(22) PCT Filed: Jan. 22, 2004

(86) PCT No.: PCT/FR2004/050025
§ 371 (c)(1),
(2), (4) Date: Apr. 5, 2006

(87) PCT Pub. No.: WO2004/067611
PCT Pub. Date: Aug. 12, 2004

(65) Prior Publication Data
US 2006/0194096 A1 Aug. 31, 2006

(30) Foreign Application Priority Data

Jan. 23, 2003 (FR) ..................................... 03 00726

(51) Int. Cl.
*B05D 1/14* (2006.01)
(52) U.S. Cl. ............ 427/201; 427/255.25; 427/255.395; 427/576; 427/385.5; 427/165; 427/389.7
(58) Field of Classification Search .................. 427/201, 427/255.25, 255.395, 576, 385.5, 165, 389.7
See application file for complete search history.

(56) References Cited

U.S. PATENT DOCUMENTS

| 5,342,521 | A | * | 8/1994 | Bardot et al. ................. 210/490 |
| 5,523,181 | A | | 6/1996 | Stonehart et al. |
| 6,059,943 | A | | 5/2000 | Murphy et al. |
| 6,270,846 | B1 | * | 8/2001 | Brinker et al. ............... 428/64.1 |
| 6,465,052 | B1 | * | 10/2002 | Wu .............................. 427/540 |
| 6,592,991 | B1 | | 7/2003 | Wiesner et al. |
| 2002/0028372 | A1 | | 3/2002 | Ohlsen et al. |
| 2002/0093008 | A1 | | 7/2002 | Kerres et al. |
| 2003/0118887 | A1 | | 6/2003 | Serpico et al. |
| 2004/0053060 | A1 | | 3/2004 | Roziere et al. |
| 2004/0106044 | A1 | | 6/2004 | Kerres |
| 2006/0182942 | A1 | | 8/2006 | Valle et al. |

FOREIGN PATENT DOCUMENTS

| CA | 2 384 045 | | 3/2001 |
| DE | 42 25 952 | | 2/1994 |
| DE | 199 43 244 | | 3/2001 |
| EP | 0 875 524 | | 11/1998 |
| JP | 2000-090946 | | 3/2000 |
| WO | WO 92/06775 | * | 4/1992 |
| WO | WO 99/12994 | * | 3/1999 |
| WO | WO 99/37705 | | 7/1999 |
| WO | WO 00/63995 | | 10/2000 |
| WO | WO 00/77080 | * | 12/2000 |
| WO | WO 01/54216 | | 7/2001 |
| WO | WO 01/84657 | * | 11/2001 |
| WO | WO 02/05370 | * | 1/2002 |
| WO | WO 02/23646 | | 3/2002 |
| WO | WO 02/04143 | | 5/2002 |

OTHER PUBLICATIONS

Patent Abstracts of Japan, Publication No. 2003016834, published Jan. 17, 2003, Search Report.
Adjemian, K. T. et al., "Silicon oxide Nafion composite membranes for proton-exchange membrane fuel cell operation at 80-140 degrees C", Journal of the Electrochemical Society 2002, 149, A256-A261.
Alberti, G. et al. "Solid state protonic conductors, present main applications and future prospects", Solid State Ionics 2001, 145, 3-16.
Baradie, B. et al., "Hybrid Nafion (R)-inorganic membrane with potential applications for polymer electrolyte fuel cells", Journal of Electroanalytical Chemistry 2000, 489, 101-105.
Bonnet, B. et al., "Hybrid organic-inorganic membranes for a medium temperature fuel cell", Journal of New Materials for Electrochemical Systems 2000, 3, 87-92.
Colomer, M. T. et al., "High porosity silica xerogels prepared by a particulate sol-gel route: pore structure and proton conductivity", Journal of Non-Crystalline Solids 2001, 290, 93-104.
Corriu, R. J. P. et al., "Ordered SBA-15 mesoporous silica containing phosphonic acid groups prepared by a direct synthetic approach", Chemical Communications 2001, 763-764.
Diaz, I: et al., "A novel synthesis route of well ordered, sulfur-bearing MCM-41 catalysts involving mixtures of neutral and cationic surfactants", Microporous & Mesoporous Materials 2001, 44, 295-302.
Genova-Dimitrova, P. et al., "Ionomeric membranes for proton exchange membrane fuel cell (PEMFC): sulfonated polysulfone associated with phosphatoantimonic acid", Journal of Membrane Science 2001, 185, 59-71.
Harmer, M. A. et al., "Nafion resin-silica nanocomposite solid acid catalysts. Microstructure-processing-property correlations", Green Chemistry 2000, 2, 7-14.
Jones D. J. et al., "Recent advances in the functionalisation of polybenzimidazole and polyetherketone for fuel cell applications", Journal of Membrane Science 2001, 185, 41-58.
LaConti, A.B., "Protein exchange membrane electrochemical capacitors and fuel cells for pulse power applications", Proceedings for the international Power Sources Symposium, Jun. 1992, pp. 298-301, Search Report.

(Continued)

*Primary Examiner* — Ling-Siu Choi
(74) *Attorney, Agent, or Firm* — Brinks Hofer Gilson & Lione

(57) ABSTRACT

An organic-inorganic hybrid material comprising two phases:
  a first, mineral phase comprising a structured mesoporous network with open porosity; and
  a second, organic phase comprising an organic polymer, said organic phase being essentially not present inside the pores of the structured mesoporous network.
Membrane and electrode comprising this material.
Fuel cell comprising at least one such membrane and/or at least one such electrode.
Process for preparing said hybrid material.

37 Claims, 5 Drawing Sheets

OTHER PUBLICATIONS

Lim, M. H. et al. "Synthesis of ordered microporous silicates with organosulfur surface groups and their applications as solid acid catalysts", Chemistry of Materials 1998, 10, 467-470.

Margolese, D. et al., "Direct syntheses of ordered SBA-15 mesoporous silica containing sulfonic acid groups", Chemistry of Materials 2000, 12, 2448-2459.

Matsuda, A. et al., "Proton conductivity of acid-impregnated mesoporous silica gels prepared using surfactants as a template", Solid State Ionics 2001, 145, 135-140.

Matsuda, A. et al., Sol-gel derived porous silica gels impregnated with sulfuric acid—Pore structure and proton conductivities at medium temperatures, Journal of the Electrochemical Society 2002, 149, E292-E297.

Mauritz, K. A. "[Perfluorosulfonate ionomer]/silicate hybrid membranes via base-catalyzed in situ sol-gel process for tetraethylorthosilicate", Journal of Membrane Science 2000, 168, 39-51.

Mikhailenko, S. et al., "Solid electrolyte properties of sulfonic acid functionalized mesostructured porous silica", Microporous & Mesoporous Materials 2002, 52, 29-37.

Miyake, N. et al., "Evaluation of a sol-gel derived Nafion/silica hybrid membrane for proton electrolyte membrane fuel cell applications—I. Proton conductivity and water content", Journal of the Electrochemical Society 2001, 148, A898-A904.

Nishiwaki, S. et al., "Preparation and proton conductivity of surfactant-templated mesoporous silica gels impregnated with protonic acids", Journal of the American Ceramic Society 2000, 83, 3004-3008.

Park, Y. et al. "Proton exchange nanocomposite membranes based on 3-glycidoxypropyltrimethoxysilane, silicotungstic acid and alpha-zirconium phosphate hydrate", Solid State Ionics 2001, 145, 149-160.

Sayari, A. et al., "Periodic mesoporous silica-based organic—Inorganic nanocomposite materials", Chemistry of Materials 2001, 13, 3151-3168.

Staiti, P. "Proton conductive membranes constituted of silicotungstic acid anchored to silica-polybenzimidazole matrices", Journal of New Materials for Electrochemical Systems 2001, 4, 181-186.

Soler-Illia, GJ. et al., "Chemical strategies to design textured materials : From microporous and mesoporous oxides to nanonetworks and hierarchical structures", Chemical Reviews, 2002, 102(11) : 4093-4138.

Stangar, U. L. et al., "Proton-conducting sol-gel hybrids containing heteropoly acids", Solid State Ionics 2001, 145, 109-118.

Vichi, F. M. et al., "Nanopore ceramic membranes as novel electrolytes for proton exchange membranes", Electrochemical & Solid-State Letters 1999, 2, 313-316.

Wang, H. et al., "Nafion-bifunctional silica composite proton conductive membranes", Journal of Materials Chemistry 2002, 12, 834-837.

Yang, C. et al. "Composite Nafion/zirconium phosphate membranes for direct methanol fuel cell operation at high temperature", Electrochemical & Solid-State Letters 2001, 4, A31-A34.

Zoppi, R.A. et al., "Electrochemical impedance studies of hybrids of perfluorosulfonic acid ionomer and silicon oxide by sol-gel reaction from solution", Journal of Electroanalytical Chemistry 1998, 445, 39-45.

Feng, Q. W. et al., "Synthesis of polystyrene-silica hybrid mesoporous materials via the nonsurfactant-templated sol-gel process", Journal of Materials Chemistry 2000, 10, 2490-2494.

Melde, B. J. et al. "Mesoporous sieves with unified hybrid inorganic/organic frameworks", Chemistry of Materials 1999, 11, 3302-3308.

Minke, M. R. et al. "Surface area and porosity engineering of alkylene-bridged methoxysilanes"; 222nd American Chemical Society National Meeting, Washington, D. C.: Chicago, US, Aug. 26-30, 2001, Abstract Only.

Office Action received from U.S. Patent and Trademark Office for co-pending U.S. Appl. No. 10/542,813, date mailed Sep. 16, 2009.

* cited by examiner

PVBu-SiO$_2$-D

PVBu-SiO$_2$-E

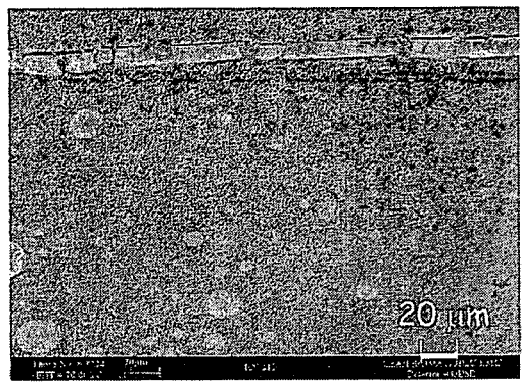
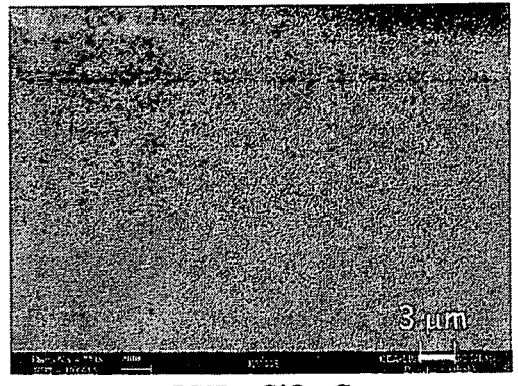
PVBu-SiO$_2$-B
PVBu-SiO$_2$-C
FIG. 9A
FIG. 9B
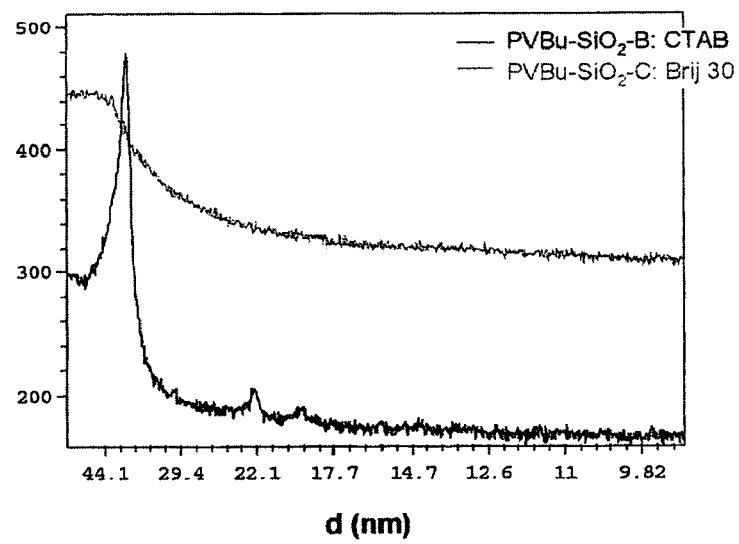
FIG. 10

ORGANIC-INORGANIC HYBRID MATERIAL COMPRISING A MINERAL MESOPOROUS PHASE AND AN ORGANIC PHASE, A MEMBRANE AND FUEL CELL

The present invention concerns an organic-inorganic hybrid material comprising a mesoporous mineral phase and an organic phase.

The invention additionally concerns a membrane and an electrode comprising said material.

The invention likewise pertains to a fuel cell comprising at least one such membrane and/or at least one such electrode.

The invention relates, finally, to a process for preparing the organic-inorganic hybrid material.

The technical field of the invention may be defined, generally speaking, as being that of porous materials and more particularly of materials referred to as mesoporous.

More specifically the invention is situated within the field of mesoporous materials intended for use in electrochemistry, in particular in fuel cells, such as those of PEMFC (polymeric electrolyte membrane fuel cell) type.

It is known that one of the essential elements of fuel cells—for example, those used in the automotive sector and in the mobile telephony sector—is the proton exchange membrane.

These membranes structure the core of the fuel cell and are consequently required to exhibit good proton conduction performance and a low permeability to the reactant gases ($H_2$/$O_2$). The properties of the materials which constitute the solid polymer electrolytes forming these membranes, and which are required to withstand thousands of hours of operation of the cell, are essentially chemical stability and resistance to hydrolysis and to oxidation, especially hydrothermal resistance, and a certain mechanical flexibility.

Membranes prepared from perfluorinated ionomers, particularly Nafion®, meet these requirements for operating temperatures below 90° C.

This temperature, however, is insufficient to allow the integration of fuel cells comprising such membranes in a vehicle. This is because such integration presupposes an increase in the operating temperature toward 100-150° C. with the aim of increasing the current/energy conversion yield and hence the efficacy of the fuel cell, but also of improving the control of heat management by reducing the volume of the radiator.

Furthermore, the conductive efficiency of proton membranes is strongly linked to the presence of water in the medium. At temperatures greater than 100° C., water is rapidly evacuated from the membrane, the conductivity falls, and the fuel permeability goes up. At these temperatures, this decrease in performance may be accompanied by degradation of the membrane. In order to solve the problems of membrane dryout in fuel cells at high temperature, namely at least 100° C., the maintenance of a maximum, 80-100% relative humidity is necessary, but is difficult to realize by means of an external source.

On the other hand, it is known that the insertion or growth of a hygroscopic filler "in situ" promotes the retention of water within the polymer, retards this process of dehydration of the proton medium, and thus ensures the conduction of protons. Besides it hydrophilic nature, this functional filler may intrinsically possess conductive properties and may thus increase the performance of the membrane.

In order to increase the retention of water in the membranes in fuel cells at high temperature, numerous composite membranes have been developed, in particular by growth of hydrophilic inorganic nanoparticles. These mineral nanofillers can be synthesized by a sol-gel route in perfluorinated sulfonated organic matrices, but also in matrices composed of polyaromatic compounds, or of polyethers. These membranes are presently called organic-inorganic hybrid membranes.

The mineral particles may be:
conductive, in which case they are of acidic type, such as, for example, tungstophosphoric or tungstosilicic or antimonic acid, or of metal phosphate or phosphonate type, such as zirconium phosphate [1-7];
nonconductive and simply hydrophilic, such as metal and metalloid oxides $TiO_2$, $SiO_2$ etc. [8-19].

Besides improving the water management at high temperature, the reduction of the permeability of the membrane with respect to fuels is demonstrated in these organic-inorganic hybrid membranes relative, for example, to conventional membranes of Nafion® type. The thermal and chemical stability, however, remain limited since they are inherent in the sulfonated organic polymer matrix employed.

Studies presented recently by Roziere et al. [19] pertain to the functionalization of the silicate network by an amine group, which improves the interaction between the inorganic phase and the organic polymer via ionocovalent bonds.

Research conducted by Honma et al. [20-21] and Park et al. [22] on the growth of continuous organic-inorganic hybrid matrices by dispersion of heteropolyacids respectively in poly(isocyano-propyl)silsesquioxane-organic polymer (PEG, PPO, PTMO) copolymers or in cocondensates of glycidyloxy-propyltrimethoxysilane (GLYMO) and tetraethoxysilane is opening up new perspectives on the use of thermally stable polymeric chains.

Although mineral heteropolyacids remain highly attractive on account of their intrinsic conductivity, their incorporation at high filler levels (30% to 70% by mass) into polymers with low or no conductivity gives rise generally to problems of consequent and progressive leaching during the operation of the cell, owing to their solubility in water.

In parallel with the composite or organic-inorganic hybrid materials described above, mesoporous materials, which were initially envisioned for catalysis, in other words, essentially silica and aluminosilicates, have begun to attract the attention of certain electrochemists.

It will be recalled that materials referred to as mesoporous are solids which within their structure have pores possessing a size of typically between 2 and 80 nm, which is intermediate between that of micropores and that of macropores.

Typically, mesoporous materials are amorphous or crystalline metal oxides in which the pores are generally distributed randomly with a very broad distribution in the size of the pores.

Structured mesoporous materials, called "mesostructured" materials, correspond, for their part, to structured pore networks which exhibit an organized spatial layout of mesopores. This spatial periodicity of the pores is characterized by the appearance of at least one low-angle peak in an X-ray scattering diagram; this peak is associated with a repeat distance which is generally between 2 and 50 nm. The mesostructure is verified by transmission electron microscopy.

In this context, the sol-gel process offers innovative strategies in the construction of these organized mesoporous edifices, particularly by inorganic polymerization within organized molecular systems (OMS) of surfactants or within organized polymeric systems (OPS) of block copolymers.

In the presence of OMS-type templating agents, this gentle chemistry also makes it possible, starting from inorganic and organometallic precursors, to synthesize organic-mineral-type mesostructured networks of a kind referred to as organic-inorganic hybrid materials. The properties of these mesoporous organic-inorganic hybrid materials depend not only on the chemical nature of the organic and inorganic components but also on the synergy which may appear between these two chemistries.

This is why these materials are often called "multifunctional" materials.

The degree of organization is governed by the nature of these two organic and inorganic entities but also by the multiscale layout of this arrangement. Thus, the integration into an ordered mesoporous structure, into both the "walls" and the pores, of chemical functionalities capable of inducing specific properties is of great interest in a variety of applications (catalysis, filtration, electrochemistry, etc.) [34].

Colomer et al. [23-24] have prepared nonorganized mesoporous silicas by coaggregating silica nanoparticles of different sizes or by (pH-)controlled growth of colloidal silica. They have studied the impact of such porosities on the proton conductivity of these silicas in acidic medium for PEMFCs. The high heat treatment at around 500-700° C. which is necessary to generate the porosity and the consolidation of the mesoporous silica nevertheless limits this technique to purely inorganic networks.

In contrast, the structuring of mesoporous silica synthesized by using surfactants does not require a high heat treatment and hence permits organic functionalization during the growth of the network [25]. Moreover, the structure of these materials is often well defined. This organization, in association with the high specific surface area, plays an important part in improving the conduction of protons through the hydrophilic network.

Minami et al. [26-28] have impregnated this type of silica with sulfuric or phosphoric acid, studying the influence of the pore size and of the specific surface area on conductivity and porosity. The properties obtained in terms of conductivity are of very great interest, being of the order of $2-3\times10^{-1}$ S/cm.

Moreover, different mesostructured organic-inorganic hybrid silicas, possessing an $SO_3H$ [29-31] or $PO_3H_2$ [32] functionality in the pores, offer an interesting potential for fuel cells, despite having been essentially developed for catalytic applications. Kaliaguine et al. [33], who work in the electrochemical field, have carried out conductivity and water-adsorption measurements in this type of compound. These silicas exhibit in the round a pronounced hydrophilic character, and the conductivity measurements are of interest for non-optimized systems, being of the order of $10^{-2}$ S/cm at 80° C. and 100% relative humidity.

The recent literature references above concerning the possible use of mesoporous materials in electrochemical devices, such as the mesostructured mesoporous silicas constructed by OMS and OPS, are unable to give rise to a direct application in fuel cells. This is because it is impossible to convert the materials as described and mentioned in those documents into the form of membranes.

There exists, therefore, a need for a mesoporous material which can be converted into the form of a membrane, in particular a homogeneous and flexible membrane.

There also exists a need for a mesoporous material which is thermally and chemically stable and resistant to hydrolysis and to oxidation.

There subsequently exists a need for a mesoporous material of this kind which in addition can be provided with a high conductivity, in particular a high ion—preferably proton—conductivity, and which can thus be employed in membrane form in electrochemical devices, such as fuel cells, having high operating temperatures, in the region, for example, of 100 to 150° C.

This material, in the context of such a use, must allow—unlike the membranes of the prior art, based for example on perfluorinated ionomers—a high level of water retention, even at high temperature, in order to avoid membrane dryout, and must possess a high conductivity and a low fuel permeability at high temperature, in association with an absence of degradation of the membrane.

The aim of the present invention is to provide a mesoporous organic-inorganic hybrid material which meets all of the needs indicated above.

The aim of the present invention is, further, to provide a mesoporous material which does not exhibit the disadvantages, defects and drawbacks of the prior-art materials and which, if equipped with conductive functions, can be used in an electrochemical device, such as a fuel cell, while exhibiting excellent performance.

This aim and other, further aims are attained in accordance with the invention by an organic-inorganic hybrid material comprising two phases:

a first, mineral phase comprising a structured mesoporous network with open porosity; and a second, organic phase comprising an organic polymer, said organic phase being essentially not present inside the pores of the structured mesoporous network.

The specific structure of the organic-inorganic hybrid material according to the invention, which comprises a mesoporous mineral phase and an organic phase, has never been described in the prior art, where there is no instance of the growth of mesoporous mineral networks, in particular conductive and/or hydrophilic networks, in a matrix comprising a mechanically structuring organic polymer.

In particular, by virtue of their high specific surface area and their particular structure, the use of mesoporous organic-inorganic hybrid materials according to the invention in proton conductive membranes offers numerous possibilities promoting the continuity of conduction pathways subject to the presence of an open porosity. By open porosity is meant a porosity formed from pores which open out and remain accessible to the conductive species.

According to a first embodiment of the material of the invention, the mineral phase and the organic phase are continuous and intermingled.

According to a second embodiment, the mineral phase is discontinuous and is dispersed in the organic phase, which is continuous.

The mineral phase may have conductive and/or hydrophilic functions on the surfaces of its pores.

Similarly, the organic phase may have conductive and/or hydrophilic functions.

The material may optionally further comprise a third phase in the inside of the pores, composed of at least one surface active agent.

This surface active agent may optionally have conductive and/or hydrophilic functions, but only where at least one of the other phases has conductive and/or hydrophilic functions.

By conductive functions it is meant, generally, that these functions exhibit an ion conductivity, preferably a proton conductivity.

If a conducting material is desired, and where that material has three phases (organic, mineral, surface active agent), at least one of the phases, selected from the mineral phase and the organic phase, must have conductive functions; it is also possible for any two of the three phases to have conductive functions, or for the three phases to have conductive functions.

Generally speaking, the material according to the invention has an open porosity serving as a continuous network of proton conduction. The mesoporous skeleton is preferably hygroscopic and possesses a conductive functionality in its pores (the compound in question is, for example, a functionalized metal oxide) which thus ensures proton transport and hydration. The organic polymeric phase serves as a support and provides primarily the structuring of the conduction medium.

A true synergy is produced between the two phases, which endows the material according to the invention with a unique combination of physical, electrical, and mechanical properties, never attained in the prior art.

The conductive functions may be selected from cation exchange groups and/or anion exchange groups.

The cation exchange groups may be selected, for example, from the following groups: —$SO_3M$; —$PO_3M_2$; —COOM and —$B(OM)_2$, where M represents hydrogen, a monovalent metal cation, or $^+NR^1_4$, where each $R^1$, independently, represents a hydrogen, an alkyl radical or an aryl radical.

The anion exchange groups may be selected for example from the following groups: pyridyl; imidazolyl; pyrazolyl; triazolyl; the radicals of formula $^+NR^2_3X^-$, where X represents an anion such as, for example, F, Cl, Br, I, $NO_3$, $SO_4H$, or OR, R being an alkyl radical or an aryl radical, and where each $R^2$, independently, represents a hydrogen, an alkyl radical or an aryl radical; and the basic aromatic or nonaromatic radicals containing at least one radical selected from imidazole, vinylimidazole, pyrazole, oxazole, carbazole, indole, isoindole, dihydrooxazole, isoxazole, thiazole, benzothiazole, isothiazole, benzimidazole, indazole, 4,5-dihydropyrazole, 1,2,3-oxadiazole, furazan, 1,2,3-thiadiazole, 1,2,4-thiadiazole, 1,2,3-benzotriazole, 1,2,4-triazole, tetrazole, pyrrole, aniline, pyrrolidine, and pyrazole radicals.

The mineral phase is generally composed of at least one oxide selected from metal oxides, metalloid oxides and mixed oxides thereof.

Said oxide is generally selected from the oxides of silicon, titanium, zirconium, hafnium, aluminum, tantalum, tin, rare earths or lanthanides such as europium, cerium, lanthanum or gadolinium, and mixed oxides thereof.

The mineral phase of the material according to the invention is a mesostructured phase, which means, more specifically, that the mesoporous network exhibits an organized structure with a repeating unit.

For example, the mesoporous network may exhibit a cubic, hexagonal, lamellar, vermicular, vesicular or bicontinuous structure.

The size of the pores of the mesoporous network is generally from 1 to 100 nm, preferably from 1 to 50 nm.

The organic polymer of the organic phase must generally meet a certain number of conditions.

Above all, said polymer must generally be thermally stable; by thermally stable is meant that it retains its properties under the action of heat.

The polymer must generally, furthermore, not be sensitive to hydrolysis and to oxidation at, in particular, high temperatures, especially at the operating temperatures of fuel cells, and must retain this insensitivity for several thousand hours.

Moreover, generally, the polymer selected must be:
soluble in an alcoholic or aqueous-alcoholic medium or in other water-miscible solvents, because the organization of the optional surface active agent in a liquid medium, the templating agent of the mesoporous phase, occurs in highly polar media such as water;
plastic, so as to provide sufficient strength to the mesoporous inorganic phase and form a self-supporting film: that is to say that the polymer may be termed a (mechanically) structuring polymer;
this polymer must not essentially play the part of a templating agent capable of generating mesoporosity.

The organic polymer will be generally selected from polyetherketones (PEK, PEEK, PEEKK); polysulfones (PSU), Udel® for example; polyethersulfones, Vitrex® for example; polyphenylethersulfones (PPSU), Radel® for example; styrene/ethylene (SES), styrene/butadiene (SBS) and styrene/isoprene (SIS) copolymers, Kraton® for example; polyphenylenes, such as poly(phenylene sulfide)s and poly(phenylene oxide)s; polyimidazoles, such as polybenzimidazoles (PBI); polyimides (PI); polyamideimides (PAI); polyanilines; polypyrroles; polysulfonamides; polypyrazoles, such as polybenzopyrazoles; polyoxazoles, such as polybenzoxazoles; polyethers, such as poly(tetramethylene oxide)s and poly(hexamethylene oxide)s; poly((meth)acrylic acid)s; polyacrylamides; polyvinyls, such as poly(vinyl ester)s, for example, polyvinyl acetates, polyvinyl formates, polyvinyl propionates, polyvinyl laurates, polyvinyl palmitates, polyvinyl stearates, polyvinyl trimethylacetates, polyvinyl chloroacetates, polyvinyl trichloroacetates, polyvinyl trifluoroacetates, polyvinyl benzoates, polyvinyl pivalates, and polyvinyl alcohols; acetal resins, such as polyvinyl butyrals; polyvinylpyridines; polyvinylpyrrolidones; polyolefins, such as polyethylenes, polypropylenes, and polyisobutylenes; poly(styrene oxide)s; fluoro resins and polyperfluorocarbons, such as polytetrafluoroethylenes (PTFE), for example, Teflon®; poly(vinylidene fluoride)s (PVDF); polychlorotrifluoroethylenes (PCTFE); polyhexafluoropropenes (HFP); perfluoroalkoxides (PFA); polyphosphazenes; silicone elastomers; and block copolymers comprising at least one block composed of a polymer selected from the above polymers.

When the material comprises a third phase, inside the pores, composed of a surface ctive agent, the latter may be selected from: alkyltrimethylammonium salts, alkyl phosphate salts and alkylsulfonate salts; acids such as dibenzoyltartaric acid, maleic acid or long-chain fatty acids; bases such as urea or long-chain amines; phospholipids; doubly hydrophilic copolymers whose amphiphilicity is generated in situ by interaction with a substrate; and amphiphilic multiblock copolymers comprising at least one hydrophobic block in combination with at least one hydrophilic block. Among these polymers mention may be made, for example, of Pluronics® based on PEO (poly(ethylene oxide)) and PPO (poly (propylene oxide)), of $(EO)_n$-$(PO)_m$-$(EO)_n$ type, copolymers of $((EO)_n$-$(PO)_m)_x$—$NCH_2CH_2N$-$((EO)_n$-$(PO)_m)_x$ type (Tetronic®), the class $C_n(EO)_m(OH)$ ($C_n$=aryl and/or alkyl chain, EO=ethylene oxide chain), for example, Brij®, Triton® or Igepal®, and the class $(EO)_m$-sorbitan-$C_n$ (Tween®).

It is important to note that the organic polymer of the organic phase must in no case be confused with an optional surfactant polymer. Although both called "polymers", these compounds are different in terms both of their structure and of their effects. The polymer of the organic phase is a polymer termed (mechanically) "structuring", whereas the optional surface active polymer is termed "templating", "texturizing".

The invention concerns, moreover, a membrane comprising the material as described above, optionally deposited on a support.

By membrane is meant that the material is in the form of a film or sheet with a thickness, for example, of 50 nm to several millimeters, preferably from 10 to 500 µm.

The invention also pertains to an electrode comprising the material, as described above.

The excellent properties of the material according to the invention, in the form of a membrane and/or electrode, make it particularly suitable for use in an electrochemical device, a fuel cell for example.

The invention therefore likewise concerns a fuel cell comprising at least one membrane and/or electrode as described above.

The invention likewise pertains to a process for preparing an organic-inorganic hybrid material, as described above, in which the following steps are realized:

a) a solution is prepared, in a solvent, of a mineral precursor A intended to constitute the mesoporous mineral phase, and optionally this solution is hydrolyzed and allowed to age;

b) a solution is prepared, in a solvent, of a structuring surface active agent D, a templating texturizing agent for the mesoporous mineral phase;

c) a solution is prepared, in a solvent, of an organic polymer E;

d) at the end of steps a), b) and c), the solution of templating agent D is added to the solution of organic polymer E and homogeneization is carried out, and then the solution of mineral precursor A is added with stirring to the resultant mixture of the solutions of surface active agent D and of organic polymer E; or else the solution of precursor A is added to the solution of surface active agent D and homogeneization is carried out, and then the solution of organic polymer E is added with stirring; or else the solution of precursor A is added to the solution of organic polymer E and homogeneization is carried out, and then the solution of surface active agent D is added with stirring;

whereby an organic-inorganic hybrid solution is obtained; and the resultant organic-inorganic hybrid solution is optionally allowed to age;

e) the organic-inorganic hybrid solution is deposited or impregnated on a support;

f) solvents are evaporated under controlled pressure, temperature, and humidity conditions;

g) a heat treatment is carried out to consolidate the deposited or impregnated material;

h) the surface active agent D is optionally removed completely or partially;

i) the support is separated or removed, optionally.

It should be noted that, when the material prepared is in the form, in particular, of a thin film, or layer, and when it is deposited or impregnated on a substrate, a planar substrate, for example, the process may be defined as being a process for preparing a membrane.

The process according to the invention exhibits a unique sequence of specific steps which allow appropriate growth by the "sol-gel" route of the optionally functionalized mesoporous inorganic (mineral) phase in the polymeric organic matrix. The conditions of the process ensure that a material is obtained, and then that a homogeneous and flexible membrane is obtained, coupled with the construction of the mesoporosity.

By virtue of the process according to the invention, the growth of the mesoporous phase in the structuring organic polymeric medium is perfectly controlled, especially in the presence of a surface active templating, texturizing agent.

Advantageously, a chelating agent B is further added to the solution of mineral precursor A.

Advantageously, a compound C, carrying, on the one hand, conductive and/or hydrophilic functions and/or functions which are precursors of conductive and/or hydrophilic functions, and, on the other hand, functions capable of undergoing bonding to the surfaces of the pores of the mesoporous network, is further added. Advantageously, the process further comprises a final step of treatment to liberate or generate conductive and/or hydrophilic functions on the surface of the pores of the material.

Advantageously, the solution A is left to age at a temperature of 6° C. to 300° C., preferably of 20 to 200° C., at a pressure of 100 Pa to $5 \cdot 10^6$ Pa, preferably of 1000 Pa to $2 \cdot 10^5$ Pa, for a time of a few minutes to a few days, preferably of one hour to one week.

Advantageously, the organic-inorganic hybrid solution obtained in step d) is left to age at a temperature of 0° C. to 300° C., preferably of 20° C. to 200° C., at a pressure of 100 Pa to $5 \cdot 10^6$ Pa, preferably of 1000 Pa to $2 \cdot 10^5$ Pa, for a time of a few minutes to a few days, preferably of one hour to one week.

Advantageously, the solvents are evaporated at a temperature of 0 to 300° C., preferably of 10° C. to 160° C., at a relative humidity (RH) of 0 to 100%, preferably of 20% to 95%. These evaporation conditions make it possible in particular to obtain a homogeneous and flexible membrane which has the required mesoporosity.

In step e), the organic-inorganic hybrid solution is deposited or impregnated on a support by means, for example, of a method selected from the method of deposition by centrifugal coating known as spin coating, the method of deposition by immersion and withdrawal known as dip coating, the method of deposition by laminar coating known as meniscus coating, the method of deposition by spraying known as "spray coating", the method of deposition by casting and the method of deposition by evaporation.

BRIEF DESCRIPTION OF THE DRAWINGS

The invention will be better understood on reading the description which now follows, and which is given by way of illustration and not of limitation, referring to the attached drawings, in which.

The curves correspond, from top to bottom, respectively, to the diagrams for the $SiO_2$/Nafion: 20%; $SiO_2$/Nafion: 50%, and $SiO_2$/Nafion: 10% samples.

FIGS. 2A to 2D give micrographs produced by scanning electron microscopy, which show the morphology of a section of the Nafion-$SiO_2$-A and Nafion-$SiO_2$-C membranes (Example 1).

Figures 2A, 2B:
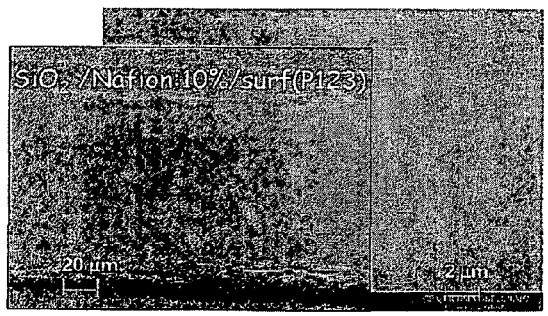

FIGS. 2A and 2B: $SiO_2$/Nafion®: 10%/surfactant P123 membrane, with scales, respectively, of 20 µm and 2 µm.

Figures 2C, 2D:
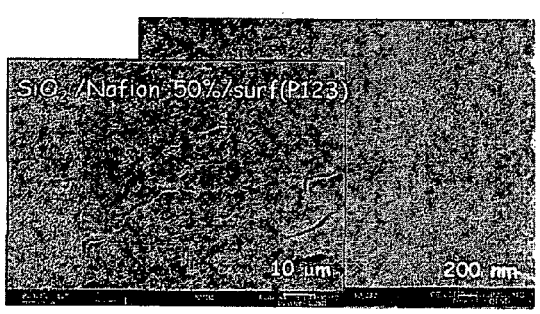

FIGS. 2C and 2D: $SiO_2$/Nafion®: 50%/surfactant P123 membrane, at scales, respectively, of 10 µm and 200 nm.

Figure 3:
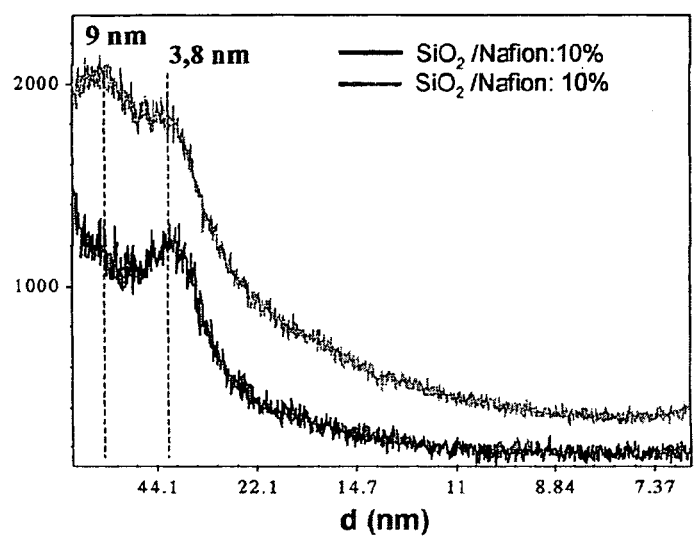

FIG. 3 is a graph which represents the diagrams of analysis by small-angle X-ray scattering of the NAFION®/$SiO_2$ sample A and of this same sample treated chemically (Example 1).

On the ordinate is plotted the number of counts, and on the abscissa d (nm).

The curves correspond, from top to bottom, respectively, to the diagrams for the treated $SiO_2$/Nafion: 10% sample and for the untreated $SiO_2$/Nafion: 10% sample.

Figures 4A, 4B:
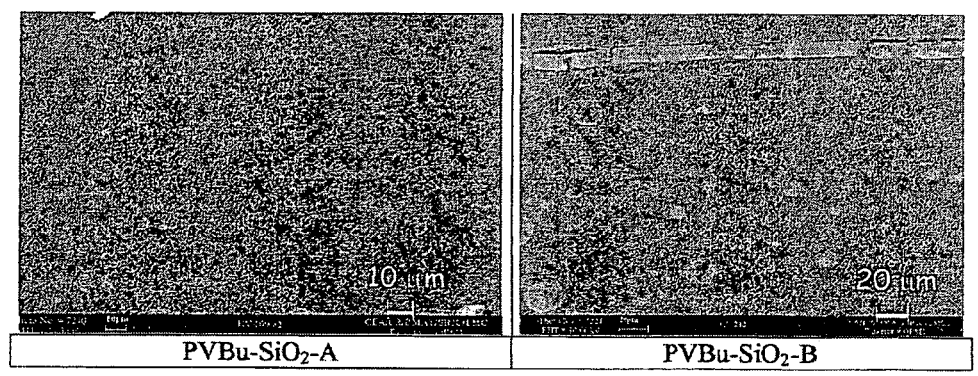

FIGS. 4A and 4B give micrographs produced by scanning electron microscopy, which represent the morphology of a section of the PVBu—$SiO_2$-A (4A) and PVBu—$SiO_2$-B (4B) membranes (prepared in Example 2), with scales, respectively, of 10 µm and of 20 µm.

Figure 5:
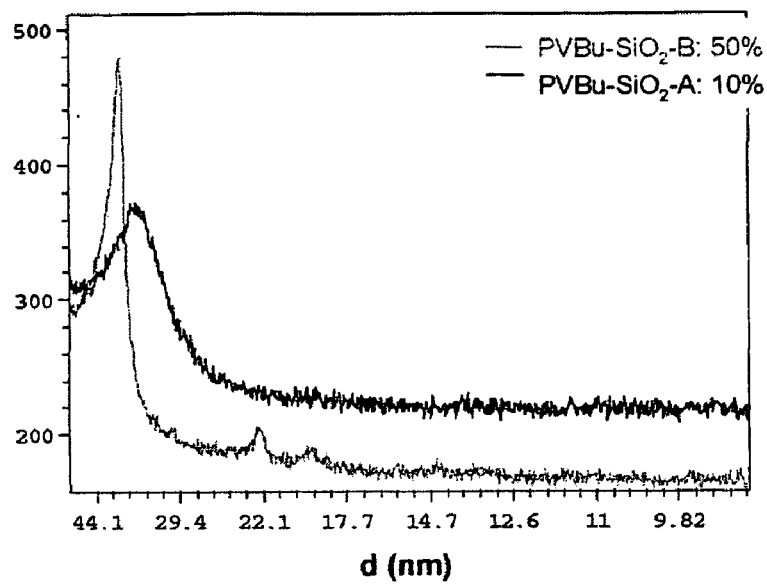

FIG. 5 is a graph which represents the analysis by small-angle X-ray scattering of the PVBu—SiO$_2$-B: 50% sample and of the PVBu-SiO$_2$-A: 10% sample, both prepared in Example 2.

On the ordinate is plotted the number of counts, and on the abscissa d (nm).

The curves (diagrams) correspond, from bottom to top, to the diagrams for the PVBu—SiO$_2$B: 50% sample (pale plot); and PVBu—SiO$_2$-A: 10% sample (dark plot).

Figure 6A:
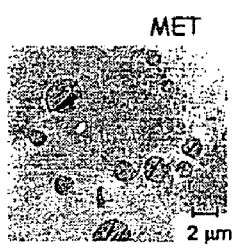
Figure 6B:
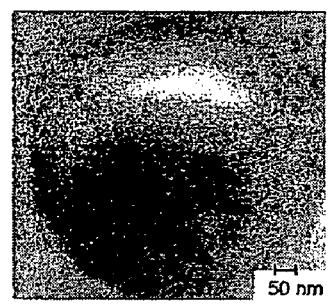
Figure 6C:
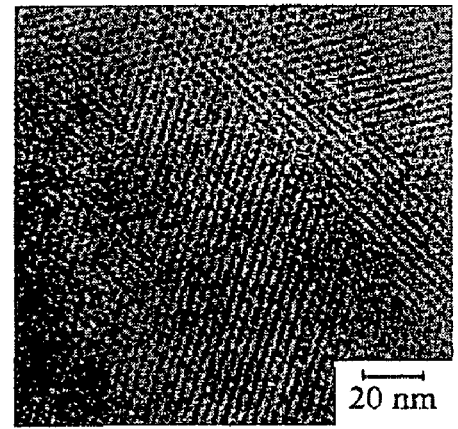

FIGS. 6A to 6C are a micrograph carried out by transmission electron microscopy of the PVBu—SiO$_2$-A membrane which has a silica content of 10%.

FIGS. 6A, 6B, and 6C have scales, respectively, of 2 μm, 50 nm, and 20 nm.

Figure 7A:
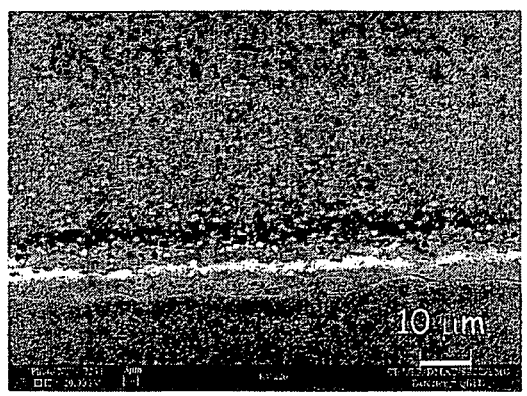
Figure 7B:
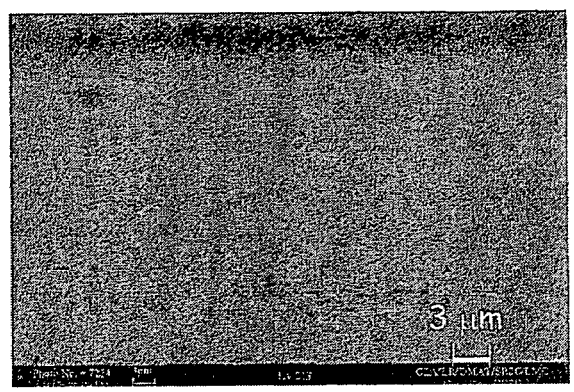

FIGS. 7A and 7B give micrographs carried out by scanning electron microscopy, which show the morphology in section of the membranes PVBu—SiO$_2$-D, with a scale of 10 μm (7A), and PV-SiO$_2$-E (7B), with a scale of 3 μm.

Figure 8:
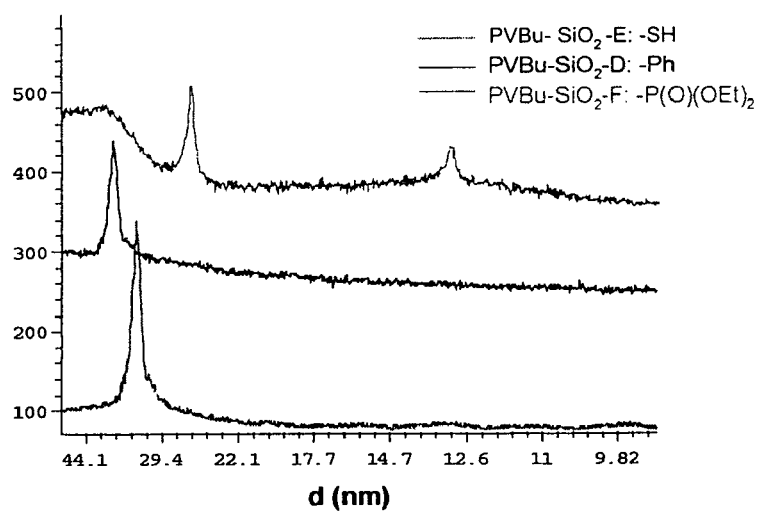

FIG. 8 is a graph which represents the diagrams of analysis by small-angle X-ray scattering of the samples PVBu—SiO$_2$-E: —SH; PVBu—SiO$_2$-D: -Ph; and PVBu—SiO$_2$-F: -P(O)(OET)$_2$.

On the ordinate is plotted the number of counts, and on the abscissa d (nm). The sections correspond, from top to bottom, to the diagrams for the samples PVBu-SiO$_2$-F; PVBu-SiO$_2$-D; and PVBu-SiO$_2$-E (Example 2).

FIGS. 9A and 9B give micrographs carried out by scanning electron microscopy, which show the morphology in section of the membranes PVBu-SiO$_2$-B, with a scale of 20 μm (9A), and PVBu-SiO$_2$-C, with a scale of 3 μm (9B).

FIG. 10 is a graph which represents the diagrams of analysis by small-angle X-ray scattering of the samples PVBu—SiO$_2$-B and PVBu-SiO$_2$-C (Example 2).

On the ordinate is plotted the number of counts, and on the abscissa d (nm).

The curves correspond from top to bottom, respectively, to the diagrams of the sample PVBu—SiO$_2$-B:CTAB and the sample PVBu—SiO$_2$-C:Brij®30.

The text below describes a process for preparing, according to the invention, a conducting organic-inorganic hybrid material having a polymeric organic phase and a mesoporous mineral phase, and also, optionally, a third, surfactant phase.

This process comprises the following steps:

1. Preparation of a Polymeric Sol-Gel Solution 1.a Preparation of a Precursor Solution Based on Inorganic Component A The synthesis begins with the preparation of the inorganic precursor which is to constitute the architecture of the mineral mesoporous network.

Typically, the precursor A is selected from metalloid salts, or transition metal salts, or lanthanide salts, such as silicon, titanium, zirconium, hafnium, aluminum, tantalum, tin, europium, cerium, lanthanum, and gadolinium, or the various metal alkoxides of these metals.

This precursor is diluted in a liquid medium; the choice of the solvent or of the solvent mixture is selected as a function of the miscibility medium of the polymer used subsequently; typically the solvent is selected from alcohols, ethers, and ketones which are miscible or partially miscible with water.

This solution is hydrolyzed or not (in an acidic or basic catalytic medium) for a determined time, which may extend from several minutes to several hours, depending on the choice of the metallic precursor. Particularly in the case of metallic precursors of high reactivity, such as precursors based on zirconium or titanium, a chelating agent B, such as acetylacetone, acetic acid or phosphonates, may be introduced in order to control the hydrolysis/condensation of the inorganic network.

To this precursor or to this mixture of these metallic precursors, a molar amount C of an organometallic compound containing hydroxyl functions or hydrolyzable functions of alkoxide type, and non-hydrolyzable or grafted functions, may be added over the same time as the purely metallic compound(s) of the same type. This compound C corresponds, for example, to the formula $R^3_x R^4_y M'OR_{(n-(x+y))}$, where M' represents an element from group IV, for example: Si, or to the formula $ZR^3_x ZR^4_y M'' OR_{(n-(x+y))}$, where M'' is a p metal, a transition metal or a lanthanide such as Ti, Zr, Ta, Al, Sn, Eu, Ce, La or Gd, where n is the valence of the metal, and Z is a complexing function of monodentate type, such as an acetate, phosphonate or phosphate function, or a function of bidentate type, such as β-diketones and derivatives thereof, and α- or β-hydroxy acids, $R^3$, $R^4$, and R are organic substituents of H, alkyl or aryl type. Particularly for $R^3$, these substituents may include cation exchange groups: such as —SO$_3$M, —PO$_3$M$_2$, —COOM or —B(OM)$_2$, in which M represents H, a monovalent metal cation, or $N^+R^1_4$, where each $R^1$ represents, independently, H, alkyl or aryl; or precursors of cation exchange groups: SO$_2$X, COX or PO$_3$X$_2$, with X=F, Cl, Br, I or OR' (R'=alkyl or aryl); or anion exchange groups: such as $^+NR^2_3X^-$, where X represents an anion such as, for example, F, Cl, Br, I, NO$_3$, SO$_4$H or OR, R represents an alkyl radical or an aryl radical, and where each $R^2$ represents, independently, H, alkyl, aryl, pyridinium, imidazolinium, pyrazolium or sulfonium; it will also be possible to refer to the list given earlier on above.

1.b Preparation of the Precursor Solution Based on Templating, Texturizing, Agent D The selection of the templating agent depends on the desired mesostructure—for example, cubic, hexagonal, lamellar, vesicular or vermicular; on the size of the pores and the walls of this mesostructure; and on its solubilization with the other compounds of the present invention, namely the polymer and the mineral precursor. In general, use will be made of surfactant-containing templating agents, of ionic types, such as alkyltrimethylammonium salts, alkyl phosphate salts and alkylsulfonate salts, or of acids, such as dibenzoyltartaric acid, maleic acid, or long-chain fatty acids, or of bases, such as urea and long-chain amines, to construct mesoporous edifices in which the size of the pores is limited to a few nanometers—1.6 to 10 nm, for example—and the size of the walls to approximately 1 nm. It is also possible to use phospholipids, doubly hydrophilic copolymers whose amphiphilicity is generated in situ by interaction with a substrate, or amphiphilic multiblock copolymers comprising at least one hydrophobic block in combination with at least one hydrophilic block, typically, such as Pluronics® based on PEO (poly(ethylene oxide)) and PPO (poly(propylene oxide)), of $(EO)_n$-$(PO)_m$-$(EO)_n$ type, copolymers of $((EO)_n$-$(PO)_m)_x$-$NCH_2CH_2N$-$((EO)_n$-$(PO)_m)_x$ type (Tetronic®), the class $C_n(EO)_m(OH)$ ($C_n$=aryl and/or alkyl chain, EO=ethylene oxide chain), for example, Brij®, Triton® Tergitol or Igepal®, and the class $(EO)_m$-sorbitan-$C_n$ (Tween®), to prepare mesoporous phases with a larger pore size (up to 50 nm). These various blocks were also able to be of acrylic nature, PMAc (poly(methacrylic acid)) or PAAc (poly(acrylic acid)), aromatic PS (polystyrene), vinylic PQVP (polyvinylpyridine), PVP (polyvinylpyrrolidone), PVEE (polyvinyl ether) or other PDMS (polysiloxane) kind. These various blocks may be functionalized by a conducting group of cation exchange type: —SO$_3$M, —PO$_3$M$_2$, —COOM or —B(OM)$_2$ (M=H, monovalent metal cation, ammonium, or $N^+R^1_4$ with R'=H, alkyl or aryl); or precursors of cation exchange groups: $SO_2X$, COX or $PO_3X_2$ (X=F, Cl, Br, I or OR' (R'=alkyl or aryl); or anion exchangers: such as $^+NR^2_3X^-$, where X represents an anion such as, for example, F, Cl, Br, I, $NO_3$, $SO_4H$ or OR, R being an alkyl radical or an aryl radical, and where each $R^2$ represents, independently, H, alkyl, aryl, pyridinium, imidazolinium, pyrazolium or sulfonium; it will also be possible to refer to the list given earlier on above. Mention is made, for example, of PSS (poly(styrenesulfonic) acid). The selected structure-directing agent D is dissolved or diluted in an aqueous-alcoholic medium or in an aqueous-based solvent mixture compatible with the medium used to dilute the polymer and the metallic precursor.

1.c Preparation of the Precursor Solution Based on Organic Polymer E

The organic polymer E, selected for its thermal stability properties, is diluted or swollen with a solvent or mixture of solvents of alcohol, ether or ketone type which are miscible or partially miscible with water. Typically this polymer may be selected from the polymers already described earlier on above.

These various polymers may comprise cation exchange groups: —$SO_3M$, —$PO_3M_2$, —COOM or —$B(OM)_2$, with M=H, monovalent metal cation, or $N^+R^1_4$ ($R^1$=H, alkyl, or aryl); or precursors: $SO_2X$, COX, or $PO_3X_2$, with X=F, Cl, Br, I or OR' (R'=alkyl or aryl). In another model, the various polymers may comprise anion exchange groups already defined earlier on above: namely: $^+NR^2_3X^-$, where X represents an anion such as, for example, F, Cl, Br, I, $NO_3$, $SO_4H$ or OR (R being an alkyl radical or an aryl radical) and each $R^2$ represents, independently, H, alkyl, aryl, pyridinium, imidazolinium, pyrazolium or sulfonium; it will also be possible to refer to the list given earlier on above.

1.d Preparation of the Surfactant-Containing Organic-Inorganic Hybrid Solution F The surfactant-based precursor solution D is added at ambient temperature to the polymeric solution E. Following homogenization of the medium, the precursor solution based on inorganic component A, comprising a molar fraction X of C ($0 \leq X \leq 0.4$), is added at ambient temperature, dropwise, to the reaction medium. Stirring at controlled temperature from the ambient to reflux is maintained for several hours. This aging of the organic-inorganic hybrid solution may be prolonged for several days, depending on the selection of the polymer and of the inorganic network. The composition of the formulation is

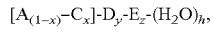

where Y=mol(D)/[mol[$A_{(1-x)}$–$C_x$]+mol(D)] and $0 \leq Y \leq 0.2$ and where Z=g(E)/[g($MO_2$)+g(E)] and $0 \leq Z \leq 0.9$.

2. Preparation of the Polymeric Sol-Gel Membrane.

The membrane is produced by casting of the organic-inorganic hybrid solution and evaporation under controlled pressure, temperature and humidity (15° C.<T<80° C.). The evaporation conditions are very important for the organization of the surfactant in the liquid medium, the final formation of the mesoporous network, and the interpenetration of the two cocontinuous networks. The membranes obtained are subsequently heat-treated at between 50° C. and 300° C., depending on the nature of the polymer, to effect consolidation. The surfactant present in the mesopores of the membrane may be removed by a gentle technique, such as, for example, washing in acidic, aqueous-alcoholic medium. A post-reaction to liberate or generate the conductive function bonded to the inorganic network may be carried out. Typically this type of post-reaction may be:

an oxidation of a mercaptan group (—SH) by hydrogen peroxide in sulfonic acid $SO_3H$, or the hydrolysis of a dialkylphosphonate function $(RO)_2(O)$P— with HCl, directly or via the formation of an intermediate $(Me_3SiO)_2(O)P$—, followed by hydrolysis with MeOH, to form a phosphonic acid —$PO_3H_2$.

This post-reaction may also correspond to a grafting of the surface hydroxyls M—OH of the inorganic network of the membrane with a metal organoalkoxide. In all of these cases, the membrane is placed in a liquid medium, to allow it to swell and to allow the reactive molecular entities to spread within the pores of the membrane.

In order to avoid any side reaction within the membrane during the operation of the cell, the proton conductive membrane is purified by various oxidizing, acidic (or basic), and aqueous washes, which allow all of the labile organic, organomineral or inorganic entities to be removed.

In the process according to the invention, the growth of the mesoporous phase in the structuring organic polymeric medium is outstandingly controlled in the presence of a templating surfactant. This control is linked in particular to the appropriate choice of the solvents, such as alcohols, ethers, and ketones, which are miscible or partially miscible with water, of the precursors, and of the operating conditions, set out in detail earlier on above.

The membrane may also be prepared in the form of a self-supporting film, using liquid deposition techniques, namely centrifugal coating (spin coating), immersion/withdrawal (dip coating) or laminar coating (meniscus coating). This formed film is subsequently detached from its support by swelling in a solvent such as water.

The spraying technique known as spray coating may also be used to form aerosols from the organic-inorganic hybrid solution and so to carry out the impregnation of the electrodes, so as, in particular, to enhance the electrode-membrane compatibility on assembly to form the cell.

The invention will now be described by reference to the following examples, which are given by way of illustration, and not of limitation.

EXAMPLE 1

Hybrid Membrane Based on Nafion® and Silica

A solution is prepared based on an organomineral silica precursor: tetraethoxysilane, TEOS; a surface active agent: a triblock copolymer of type $EO_{20}$-$PO_{70}$-$EO_{20}$, Pluronic® P123, in ethanol. The Nafion® polymer, in solution at 20%, sold by the company DuPont, is also diluted in ethanol, and the two solutions are then mixed. Following homogenization and aging of the hybrid solution for 12 hours, the solution is evaporated at 30° C. in a Petri dish to form a 150 μm homogenous, flexible membrane.

The silica/polymer mass ratio can be varied in this preparation:

Table 1 gives the various formulations prepared:

TABLE 1

| Sample | $SiO_2$/polymer (% by mass) | Concentration (% by mass) |
|---|---|---|
| NAFION-$SiO_2$-A | 10 | 2.2 |
| NAFION-$SiO_2$-B | 20 | 2.2 |
| NAFION-$SiO_2$-C | 50 | 2.2 |

The membranes formed are in the form of flexible self-supporting films for the samples NAFION-SiO$_2$-(A and B), whereas the 50% filler content for NAFION-SiO$_2$-C considerably increases the rigidity.

Figure 1:
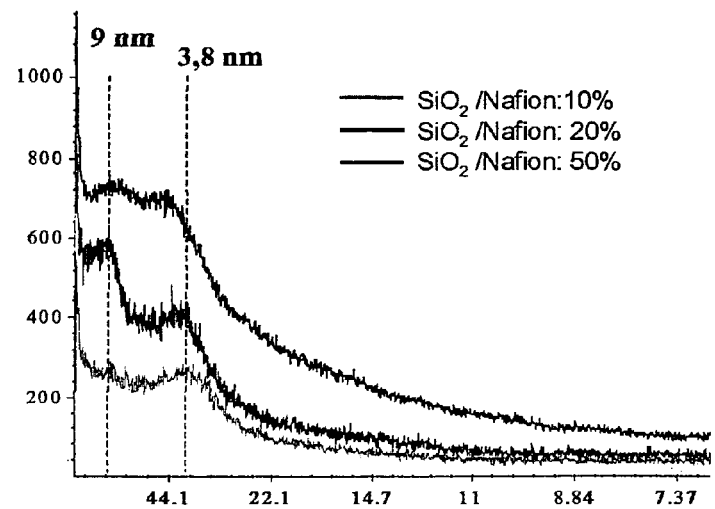
FIG. 1 is a graph which represents the diagrams of analysis by small-angle X-ray scattering of NAFION®/$SiO_2$ samples A, B and C prepared in Example 1. On the ordinate is plotted the number of counts, and on the abscissa d (nm).

FIG. 1 presents the analysis by small-angle X-ray scattering of the samples NAFION-SiO$_2$-A (bottom curve), NAFION-SiO$_2$-B (top curve), and NAFION-SiO$_2$-C (middle curve).

On the NAFION-SiO$_2$-B and NAFION-SiO$_2$-C samples the organization is observed relative to Nafion®, with a scattering peak centered at 3.8 nm, called "ionomeric peak", and a mesoporous organization is observed, characterized by a peak at 9 nm. It is known that the surfactant used, Pluronic® P123, has the characteristic of forming micelles in which the size of the pores is close to 9 nm. The NAFION-SiO$_2$-A sample exhibits only the organization relative to Nafion®. In our case, the silica content is too low to induce an observable meso-organization in X-ray scattering.

FIGS. 2A to 2D present the morphology of a section of the membranes NAFION-SiO$_2$-A and NAFION-SiO$_2$-C, analyzed by scanning electron microscopy.

FIGS. 2A and 2B are micrographs in section in the membrane SiO$_2$/Nafion: 10%/surfactant (P123), with scales of 20 μm and 2 μm respectively, and FIGS. 2C and 2D are micrographs in section of the membrane SiO$_2$/Nafion: 50%/surfactant (P123), with scales of 10 μm and 200 nm respectively.

These membranes are transparent and very homogeneous, with the silicate network embedded in the polymer.

These membranes underwent a heat treatment at 90° C. for 8 hours. An acidic and oxidizing chemical treatment was carried out on the membranes in order to remove the surfactant and to activate all of the acidic sites.

FIG. 3 presents the analysis by small-angle X-ray scattering of the sample NAFION-SiO$_2$-A (SiO$_2$/Nafion: 10%), treated chemically (top curve) or untreated (bottom curve, dark).

After chemical treatment, the scattering peak relative to a mesoporous organization appears at 9 nm, which indicates to us that we have released the pores of the silicate network by removing the surfactant.

We prepared a polymer-TEOS solution without surfactant, in accordance with the preparation cited earlier on above, with a silica content of 10%. A NAFION-SiO$_2$-X membrane is formed in the same way.

Table 2 gives the ion conductivity values of these two membranes.

TABLE 2

| Sample | SiO$_2$/polymer (% by mass) | Conductivity (S · cm$^{-1}$) |
|---|---|---|
| NAFION-SiO$_2$-A | 10 | 8 · 10$^{-3}$ S/cm |
| NAFION-SiO$_2$-X | 10 | 5 · 10$^{-3}$ S/cm |

An interesting difference is observed between the two membranes, with a conductivity result in favor of the membrane constructed on the basis of surfactant.

EXAMPLE 2

Hybrid Membrane Based on Polyvinylbutyral PVBu and Silica

A solution is prepared based on a silica precursor: tetraethoxysilane TEOS; an organosilicon precursor, an Ormosil®; and a surface active agent, in tetrahydrofuran THF.

Prehydrolysis is carried out with an aqueous solution of hydrochloric acid. The polymer PVBu is also diluted in THF, and then the two solutions are mixed. Following homogenization and aging of the hybrid solution for 12 hours, the solution is evaporated at 30° C. in a Petri dish, to form a 150 μm homogeneous, flexible membrane.

Two parameters are varied in this preparation:
1) the silica/polymer mass ratio
2) the functionalization of the silica with an Ormosil® and the nature of the Ormosil®
3) the nature or the surface active agent.

Table 3 gives the various formulations prepared:

TABLE 3

| Sample | SiO$_2$/polymer (% by mass) | Ormosil ® (mol % in SiO$_2$) | Surface active agent |
|---|---|---|---|
| PVBu-SiO$_2$-A | 10 | 0 | CTAB |
| PVBu-SiO$_2$-B | 50 | 0 | CTAB |
| PVBu-SiO$_2$-C | 50 | 0 | Brij ® 30 |
| PVBu-SiO$_2$-D | 50 | (EtO)$_3$Si(CH$_2$)$_3$SH (30) | CTAB |
| PVBu-SiO$_2$-E | 50 | (EtO)$_3$SiC$_6$H$_4$ (30) | CTAB |
| PVBu-SiO$_2$-F | 50 | (EtO)$_3$Si(CH$_2$)$_3$P(O)(OEt)$_2$ (30) | CTAB |

These various formulations in all cases give self-supporting, transparent films, of moderate flexibility, for samples PVBu—SiO$_2$— (A and C to E). The other samples (B, D, and F) provide membranes which are semiopaque and highly rigid.

1) Study of the Silica/Polymer Mass Ratio in the Membrane:

The morphology of the PVBu—SiO$_2$-A and PVBu—SiO$_2$-B membranes was observed by scanning electron microscopy, the images of which are presented in FIGS. 4A and 4B.

FIG. 4A: micrograph in section of the membrane PVBu—SiO$_2$-A (10 μm scale)

FIG. 4B: micrograph in section of the membrane PVBu—SiO$_2$-B (20 μm scale).

Relatively small spherical inclusions (1-4 μm) are observed in the sample PVBu—SiO$_2$-A and spherical inclusions of polydisperse size, and inhomogeneous, are observed distributed in the sample PVBu—SiO$_2$-B (1-20 μm), with a segregation layer due to the high, 50% silica content. These spherical particles and this layer correspond to silicate.

FIG. 5 presents the small-angle scattering diagrams of these membranes. The lower (light) curve is the diagram for PVBu—SiO$_2$-B:50%, and the upper (dark) curve is the diagram for PVBu—SiO$_2$-A:10%.

These diagrams demonstrate a mesoporous organization in the two cases, with a mesostructure of hexagonal-cylindrical type in the case of PVBu—SiO$_2$-B. The size of the pores is then approximately 4 nm.

FIGS. 6A to 6C present transmission electron micrographs of the membrane PVBu—SiO$_2$-A, which corresponds to a silica content of 10%. FIGS. 6A, 6B, and 6C are with scales, respectively, of 2 μm, 50 nm, and 20 nm.

The enlargement of one spherical particle demonstrates the presence of a very well-defined mesostructure within the silicate bead. This result confirms that of the X-ray scattering: the structure is hexagonal-cylindrical with an interplanar spacing of approximately 4 nm.

2) Functionalization of Silica with an Ormosil®, and the Nature of the Ormosil®:

The morphology of the membranes PVBu—SiO$_2$-D and PVBu—SiO$_2$-E was observed by scanning electron microscopy, the images of which are presented in FIGS. 7A and 7B.

FIG. 7A: micrograph in section of the membrane PVBu—SiO$_2$-D (10 µm scale).

FIG. 7B: micrograph in section of the membrane PVBu—SiO$_2$-E (3 µm scale).

Relatively small spherical inclusions (1 µm) are observed in the two samples; these inclusions are monodisperse and homogeneously distributed. The functionalization of the silica directs the microscale organization of the membrane, enhancing the silica/polymer compatibility.

FIG. 8 presents the small-angle scattering diagrams of these two membranes, compared with that of the membrane PVBu—SiO$_2$-F.

The top diagram is that for the membrane PVBu—SiO$_2$-F; the middle diagram is that for the membrane PVBu—SiO$_2$-D:-Ph; and the bottom diagram is that for the membrane PVBu—SiO$_2$-E:-P(O) (OEt)$_2$.

The diagrams demonstrate a mesoporous organization with a more or less defined mesostructure. In the case of sample PVBu—SiO$_2$-F, whose membrane is rigid and semiopaque to the eye, suggesting an inhomogeneity in the distribution of a silicate, it appears that two organizations coexist.

3) Nature of the Surface Active Agent

The morphology of the membrane PVBu—SiO$_2$-C was observed by scanning electron microscopy and is compared with PVBu—SiO$_2$-B. The images are presented in FIGS. 9A and 9B.

FIG. 9A: micrograph in section of the membrane PVBu—SiO$_2$-B (20 µm scale).

FIG. 9B: micrograph in section of the membrane PVBu—SiO$_2$-C (3 µm scale).

Relatively small spherical inclusions (1 µm) are observed which are distributed homogeneously in the membrane when a nonionic surfactant is used: PVBu—SiO$_2$-C. The use of this type of surfactant directs the microscale organization of the membrane, enhancing the surfactant/silica/polymer compatibility.

FIG. 10 presents the small-angle scattering diagrams of these two membranes. The bottom diagram is the diagram for the membrane PVBu—SiO$_2$-B:CTAB (in dark print) and the top diagram is the diagram for the membrane PVBu—SiO$_2$-C:Brij®30 (in light print).

This scattering diagram demonstrates a mesoporous organization with a relatively fine mesostructure in the case of PVBu—SiO$_2$-B. In this case, however, a phase separation of the silicate is apparent, given the ionic surface character.

REFERENCES (1) G. Alberti and M. Casciola Solid state protonic conductors, present main applications and future prospects, *Solid State Ionics* 2001, 145, 3-16.

(2) B. Bonnet, D. J. Jones, J. Roziere, L. Tchicaya, G. Alberti, M. Casciola, L. Massinelli, B. Bauer, A. Peraio and E. Ramunni Hybrid organic-inorganic membranes for a medium temperature fuel cell, *Journal of New Materials for Electrochemical Systems* 2000, 3, 87-92.

(3) P. Genova-Dimitrova, B. Baradie, D. Foscallo, C. Poinsignon and J. Y. Sanchez Ionomeric membranes for proton exchange membrane fuel cell (PEMFC): sulfonated polysulfone associated with phosphatoantimonic acid, *Journal of Membrane Science* 2001, 185, 59-71.

(4) N. Miyake, J. S. Wainright and R. F. Savinell Evaluation of a sol-gel derived Nafion/silica hybrid membrane for proton electrolyte membrane fuel cell applications—I. Proton conductivity and water content, *Journal of the Electrochemical Society* 2001, 148, A898-A904.

(5) C. Yang, S. Srinivasan, A. S. Arico, P. Creti, V. Baglio and V. Antonucci Composition Nafion/zirconium phosphate membranes for direct methanol fuel cell operation at high temperature, *Electrochemical & Solid-State Letters* 2001, 4, A31-A34.

(6) J. M. Fenton, H. R. Kunz and J.-C. Lin, Improved membrane electrode assemblies using ionic composite membranes for fuel cells, 2002, WO0223646.

(7) O. J. Murphy and A. J. Cisar, Composite membrane suitable for use in electrochemical devices, 2000, WO00063995.

(8) K. T. Adjemian, S. J. Lee, S. Srinivasan, J. Benziger and A. B. Bocarsly Silicon oxide Nafion composite membranes for proton-exchange membrane fuel cell operation at 80-140 degrees C., *Journal of the Electrochemical Society* 2002, 149, A256-A261.

(9) B. Baradie, J. P. Dodelet and D. Guay Hybrid Nafion (R)-inorganic membrane with potential applications for polymer electrolyte fuel cells, *Journal of Electroanalytical Chemistry* 2000, 489, 101-105.

(10) M. A. Harmer, Q. Sun, A. J. Vega, W. E. Farneth, A. Heidekum and W. F. Hoelderich Nafion resin-silica nanocomposite solid acid catalysts. Microstructure-processing-property correlations, *Green Chemistry* 2000, 2, 7-14.

(11) D. J. Jones and J. Roziere Recent advances in the functionalisation of polybenzimidazole and polyetherketone for fuel cell applications, *Journal of Membrane Science* 2001, 185, 41-58.

(12) K. A. Mauritz and J. T. Payne [Perfluorosulfonate ionomer]/silicate hybrid membranes via base-catalyzed in situ sol-gel process for tetraethylorthosilicate, *Journal of Membrane Science* 2000, 168, 39-51.

(13) S. P. Nunes and R. A. Zoppi Electrochemical impedance studies of hybrids of perfluorosulfonic acid ionomer and silicon oxide by sol-gel reaction from solution, *Journal of Electroanalytical Chemistry* 1998, 445, 39-45.

(14) E. Peled, T. Duvdevani, A. Melman and A. Aharon, Fuel Cell with proton conducting membrane, 2001, WO 0154216.

(15) P. Staiti Proton conductive membranes constituted of silicotungstic acid anchored to silica-polybenzimidazole matrices, *Journal of New Materials for Electrochemical Systems* 2001, 4, 181-186.

(16) H. T. Wang, B. A. Holmberg, L. M. Huang, Z. B. Wang, A. Mitra, J. M. Norbeck and Y. S. Yan Nafion-bifunctional silica composite proton conductive membranes, *Journal of Materials Chemistry* 2002, 12, 834-837.

(17) M. Watanabe and P. Stonehart, Polymer solid-electrolyte composition and electrochemical cell using the composition, 1996, U.S. Pat. No. 5,523,181.

(18) J. Kerres, G. Schafer and N. Nicoloso, Proton-conducting ceramic/polymer membrane for range up to 300 C., 2002, U.S. Pat. No. 2,093,008.

(19) J. Roziere, D. Jones, L. Tchicaya Boukary and B. Bauer, Materiau hybride, utilisation dudit materiau hybride et procede de sa fabrication [Hybrid material, use of said hybrid material and method for making same], 2000, WO 0205370.

(20) I. Honma, High temperature proton conductive organic-inorganic composite membranes and their manufacture, 2000, JP00090946.

(21) U. L. Stangar, N. Groselj, B. Orel, A. Schmitz and P. Colomban Proton-conducting sol-gel hybrids containing heteropoly acids, *Solid State Ionics* 2001, 145, 109-118.

(22) Y. Park and M. Nagai Proton exchange nanocomposite membranes based on 3-glycidoxypropyltrimethoxysilane, silicotungstic acid and alpha-zirconium phosphate hydrate, *Solid State Ionics* 2001, 145, 149-160.

(23) F. M. Vichi, M. T. Colomer and M. A. Anderson Nanopore ceramic membranes as novel electrolytes for proton exchange membranes, *Electrochemical & Solid-State Letters* 1999, 2, 313-316.

(24) M. T. Colomer and M. A. Anderson High porosity silica xerogels prepared by a particulate sol-gel route: pore structure and proton conductivity, *Journal of Non-Crystalline Solids* 2001, 290, 93-104.

(25) A. Sayari and S. Hamoudi Periodic mesoporous silica-based organic-Inorganic nanocomposite materials, *Chemistry of Materials* 2001, 13, 3151-3168.

(26) A. Matsuda, Y. Nono, T. Kanzaki, K. Tadanaga, M. Tatsumisago and T. Minami Proton conductivity of acid-impregnated mesoporous silica gels prepared using surfactants as a template, *Solid State Ionics* 2001, 145, 135-140.

(27) S. Nishiwaki, K. Tadanaga, M. Tatsumisago and T. Minami Preparation and proton conductivity of surfactant-templated mesoporous silica gels impregnated with protonic acids, *Journal of the American Ceramic Society* 2000, 83, 3004-3008.

(28) A. Matsuda, T. Kanzaki, K. Tadanaga, T. Kogure, M. Tatsumisago and T. Minami Sol-gel derived porous silica gels impregnated with sulfuric acid—Pore structure and proton conductivities at medium temperatures, *Journal of the Electrochemical Society* 2002, 149, E292-E297.

(29) I. Diaz, C. Marquez-Alvarez, F. Mohino, J. Perez-Pariente and E. Sastre A novel synthesis route of well ordered, sulfur-bearing MCM-41 catalysts involving mixtures of neutral and cationic surfactants, *Microporous & Mesoporous Materials* 2001, 44, 295-302.

(30) D. Margolese, J. A. Melero, S. C. Christiansen, B. F. Chmelka and G. D. Stucky Direct syntheses of ordered SBA-15 mesoporous silica containing sulfonic acid groups, *Chemistry of Materials* 2000, 12, 2448-2459.

(31) M. H. Lim, C. F. Blanford and A. Stein Synthesis of ordered microporous silicates with organosulfur surface groups and their applications as solid acid catalysts, *Chemistry of Materials* 1998, 10, 467-+.

(32) R. J. P. Corriu, L. Datas, Y. Guari, A. Mehdi, C. Reye and C. Thieuleux Ordered SBA-15 mesoporous silica containing phosphonic acid groups prepared by a direct synthetic approach, *Chemical Communications* 2001, 763-764.

(33) S. Mikhailenko, D. Desplantier-Giscard, C. Danumah and S. Kaliaguine Solid electrolyte properties of sulfonic acid functionalized mesostructured porous silica, *Microporous & Mesoporous Materials* 2002, 52, 29-37.

(34) GJD. Soler-illia, C. Sanchez, B. Lebeau, J. Patarin. Chemical strategies to design textured materials: From microporous and mesoporous oxides to nanonetworks and hierarchical structures, *Chemical Reviews,* 102(11): 4093-4138, November 2002.

The invention claimed is:

1. An organic-inorganic hybrid material comprising two phases:
   a first, mineral phase comprising a structured mesoporous network with open porosity, wherein the structured mesoporous network exhibits an organized structure with a repeating unit; and
   a second, organic phase comprising an organic polymer, said organic phase not participating in creating the structured mesoporous network of the mineral phase and being essentially not present inside the pores of the structured mesoporous network of the mineral phase.

2. The material of claim 1, further comprising a third phase, inside the pores, composed of at least one surface active agent.

3. The material of claim 1, wherein the mineral phase and the organic phase are continuous and intermingled.

4. The material of claim 1, wherein the mineral phase is discontinuous and dispersed in the organic phase, which is continuous.

5. The material of claim 1, wherein the mineral phase has conductive and/or hydrophilic functions on the surfaces of its pores.

6. The material of claim 1, wherein the organic phase has conductive and/or hydrophilic functions.

7. The material of claim 5, further comprising a third phase, inside the pores, composed of at least one surface active agent, wherein the third phase has conductive and/or hydrophilic functions.

8. The material of claim 5, wherein said conductive functions are selected from cation exchange groups.

9. The material of claim 8, wherein said cation exchange groups are selected from the following groups: $SO_3M$; $-PO_3M_2$; $-COOM$ and $B(OM)_2$, where M represents hydrogen, a monovalent metal cation, or $^+NR^1_4$, where each $R^1$, independently, represents a hydrogen, an alkyl radical or an aryl radical.

10. The material of claim 5, wherein said conductive functions are selected from anion exchange groups.

11. The material of claim 10, wherein said anion exchange groups are selected from the following groups: pyridyl, imidazolyl, pyrazolyl; triazolyl; the radicals of formula $-+NR^2_3X^-$, where X represents F, Cl, Br, I, $NO_3$, $SO_4H$ or OR, R being an alkyl radical or an aryl radical, and where each $R^2$, independently, represents a hydrogen, an alkyl radical or an aryl radical; and the basic aromatic or nonaromatic radicals containing at least one radical selected from imidazole, vinylimidazole, pyrazole, oxazole, carbazole, indole, isoindole, dihydrooxazole, isoxazole, thiazole, benzothiazole, isothiazole, benzimidazole, indazole, 4,5-dihydropyrazole, 1,2,3-oxadiazole, furazan, 1,2,3-thiadiazole, 1,2,4-thiadiazole, 1,2,3-benzotriazole, 1,2,4-triazole, tetrazole, pyrrole, aniline, pyrrolidine, and pyrazole radicals.

12. The material of claim 1, wherein the mineral phase is composed of at least one oxide selected from metal oxides, metalloid oxides and mixed oxides thereof.

13. The material of claim 12, wherein said oxide is selected from the oxides of silicon, titanium, zirconium, hafnium, aluminum, tantalum, tin, rare earths and mixed oxides thereof.

14. The material of claim 1, wherein the mesoporous network has an organized structure with a repeating unit.

15. The material of claim 14, wherein the mesoporous network has a cubic, hexagonal, lamellar, vermicular, vesicular or bicontinuous structure.

16. The material of claim 1, wherein the size of the pores is from 1 to 100 nm.

17. The material of claim 1, wherein the organic polymer is a thermally stable polymer.

18. The material of claim 17, wherein the organic polymer is selected from polyetherketones; polysulfones; polyethersulfones; polyphenylethersulfones; styrene/ethylene, styrene/butadiene, and styrene/isoprene copolymers; polyphenylenes; polyimidazoles; polyimides; polyamideimides; polyanilines; polypyrroles; polysulfonamides; polypyrazoles; polyoxazoles; polyethers; poly((meth)acrylic acid)s;

polyacrylamides; polyvinyls; acetal resins; polyvinylpyridines; polyvinylpyrrolidones; polyolefins; poly(styrene oxide)s; fluoro resins and polyperfluorocarbons; poly(vinylidene fluoride)s; polychlorotrifluoroethylenes; polyhexafluoropropenes; perfluoroalkoxides; poly-phosphazenes; silicone elastomers; and block copolymers comprising at least one block composed of a polymer selected from the above polymers.

19. The material of claim 2, wherein the surface active agent is selected from: alkyltrimethylammonium salts, alkyl phosphate salts and alkylsulfonate salts; dibenzoyltartaric acid, maleic acid or long-chain fatty acids; urea or long-chain amines; phospholipids; doubly hydrophilic copolymers whose amphiphilicity is generated in situ by interaction with a substrate; and amphiphilic multiblock copolymers comprising at least one hydrophobic block in combination with at least one hydrophilic block.

20. The material of claim 6, further comprising a third phase, inside the pores, composed of at least one surface active agent, wherein the third phase has conductive and/or hydrophilic functions.

21. The material of claim 6, wherein said conductive functions are selected from cation exchange groups.

22. The material of claim 12, wherein said oxide is selected from the oxides of europium, cerium, lanthanum, and gadolinium, and mixed oxides thereof.

23. The material of claim 1, wherein the size of the pores is from 1 to 50 nm.

24. A membrane comprising the material of claim 1, optionally deposited on a support.

25. An electrode comprising the material of claim 1.

26. A fuel cell comprising at least one membrane comprising the material of claim 1 and/or an electrode comprising the material of claim 1.

27. A process for preparing the material of claim 1, comprising the following steps:
   a) — preparing a solution, in a solvent, of a mineral precursor A intended to constitute the mesoporous mineral phase, and optionally hydrolyzing this solution and allowing the solution to age;
   b) preparing a solution, in a solvent, of a surface active agent D, a templating, texturizing agent for the mesoporous mineral phase;
   c) — preparing a solution, in a solvent, of an organic polymer E;
   d) — at the end of steps a), b) and c), adding the solution of templating agent D to the solution of organic polymer E and carrying out homogeneization, and then adding the solution of mineral precursor A with stirring to the resultant mixture of the solutions of surface active agent D and of organic polymer E; or
   adding the solution of precursor A to the solution of surface active agent D and carrying out homogeneization, and then adding the solution of organic polymer E with stirring; or
   adding the solution of precursor A to the solution of organic polymer E and carrying out homogeneization, and then adding the solution of surface active agent D with stirring;
   whereby an organic-inorganic hybrid solution is obtained; and the resultant organic-inorganic hybrid solution is optionally allowed to age;
   e) — depositing or impregnating the organic-inorganic hybrid solution on a support;
   f) — evaporating solvents under controlled pressure, temperature, and humidity conditions;
   g) — carrying out a heat treatment to consolidate the deposited or impregnated material;
   h) — optionally removing the surface active agent D completely or partially;
   i) — optionally separating or removing the support.

28. The process of claim 27, wherein a chelating agent B is further added to the solution of mineral precursor A.

29. The process of claim 27, wherein, to the solution of mineral precursor A, a compound C is further added which carries, on the one hand, conductive and/or hydrophilic functions and/or precursor functions of conductive and/or hydrophilic functions, and, on the other hand, functions capable of undergoing bonding to the surface of the pores of the mesoporous network.

30. The process of claim 27, wherein the process further comprises a final step of treatment to liberate or generate conductive and/or hydrophilic functions on the surface of the pores of the material.

31. The process of claim 27, wherein the solution A is left to age at a temperature of 0° C. and 300° C. at a pressure of 100 Pa to $5.10^6$ Pa; for a time of a few minutes to a few days.

32. The process of claim 27, wherein the organic-inorganic hybrid solution obtained in step d) is left to age at a temperature of 0 to 300° C. at a pressure of 100 Pa to $5.10^6$ Pa; for a time of a few minutes to a few days.

33. The process of claim 27, wherein the solvents are evaporated at a temperature of 0 to 300° C.; at a relative humidity (RH) of 0 to 100%.

34. The process of claim 27, wherein, in step e), the organic-inorganic hybrid solution is deposited or impregnated on a support by a method selected from the method of deposition by centrifugal coating known as spin coating, the method of deposition by immersion and withdrawal known as dip coating, the method of deposition by laminar coating known as meniscus coating, the method of deposition by spraying known as "spray coating", the method of deposition by casting and the method of deposition by evaporation.

35. The process of claim 27, wherein the solution A is left to age at a temperature of 20° C. to 200° C.; at a pressure of 1000 Pa to $2.10^5$ Pa; and for a time of one hour to one week.

36. The process of claim 27, wherein the organic-inorganic hybrid solution obtained in step d) is left to age at a temperature of 20° C. to 200° C.; and at a pressure of 1000 Pa to $2.10^5$ Pa; for a time of one hour to one week.

37. The process of claim 27, wherein the solvents are evaporated at a temperature of 10° C. to 160° C.; and at a relative humidity (RH) of 20% to 95%.

* * * * *